United States Patent Office 3,355,528
Patented Nov. 28, 1967

3,355,528
REFRACTORY GUNNING MIX
George R. Henry, Bethel Park, Pa., assignor to Harbison-Walker Refractories Company, Pittsburgh, Pa., a corporation of Pennsylvania
No Drawing. Filed Dec. 23, 1966, Ser. No. 604,127
6 Claims. (Cl. 264—30)

ABSTRACT OF THE DISCLOSURE

A method of repairing steelmaking furnaces comprising the steps of preparing a batch of coarse basic refractory aggregate and 20 to 40 parts, by weight, of dead-burned, partially stabilized dolomite substantially all minus 65 mesh and pneumatically implacing the batch on the interiors of the furnaces.

Related case

This is a continuation-in-part of my application Ser. No. 500,335, filed Oct. 21, 1965 entitled "Refractory Gunning Mix," which has been abandoned in favor of this application.

Background

Various types of refractory materials are used in large tonnages for installing and maintaining furnace linings. Basic refractory mixes are supplied for maintaining basic oxygen steelmaking vessels and open hearth and electric furnace walls and roofs and like environments coming in contact with chemically basic fumes and slags. Fireclay and high alumina gunning mixes are used in the maintenance of glass furnace linings and in the walls and arches in slab heating furnaces, soaking pits and similar environments in which neutral or acid refractories are required. This invention relates particularly to a type of basic refractory which is especially suited for gunning basic oxygen steelmaking vessels. The problem of gunning basic oxygen steelmaking vessels differ considerably from those problems encountered when gunning open hearth furnaces or glass furnace linings.

Most furnaces, for example, open hearth furnaces or glass tank furnaces, are maintained at operating temperature, for example, near 2900° F., during the normal gunning repair. This is possible because these furnaces are maintained at their elevated temperatures by the introduction of fuels and combustion air. However, the basic oxygen steelmaking vessels are not heated in this manner. Hot iron at about 2600° F. to be purified into steel, cold steel scrap, and slag making materials such as lime and dolomite are charged to the vessel. Thereafter, a stream of oxygen is directed onto the bath of hot metal causing the impurities contained within the iron to oxidize. The oxidation of these impurities raises the temperature of the metal to around 2900° F. just prior to tapping. Above the bath, the temperatures are considerably higher, for example, above 3000° F. Obviously, the lining cannot be repaired while the vessel contains the hot metal batch and must be maintained between heats. The surface of the lining to be repaired cools very rapidly as refractory repair materials and their aqueous carrier are impacted against it. Therefore, it is necessary that refractory repair materials for use in oxygen steelmaking vessels be reactive at lower temperatures enabling them to form a bond which will hold them in place. Also, they must have increased plasticity enabling them to compact against cooler walls which are less receptive to gunning. The additions of the usual binders and plasticizers while tolerated are undesirable because they cause the repaired lining to be weak at higher temperatures. Summarizing, it is necessary that a repair material for a basic oxygen steelmaking vessel be reactive at temperatures below about 2900° F. enabling it to bond, but refractory above about 3000° F. enabling it to resist the washing action of corrosive slags and gases.

There are other requirements of repair materials for the oxygen vessel. They should preferably be chemically basic, that is, made from magnesite, dolomite, lime, chrome ore, or mixtures thereof in order to have resistance to the chemically basic slags formed during the steelmaking process. They should be sized so that they travel freely through the pneumatic placing guns commonly used. A further requirement of these materials is that they be size graded to compact against the furnace wall with a minimum of rebound loss.

It is therefore an object of this invention to provide a refractory gunning mix for the repair of basic oxygen steelmaking vessels which is reactive below about 2900° F. and refractory above about 3000° F. It is a further object of this invention to provide a refractory repair material which contains substantially all dead burned hydratable dolomitic material in its finer fractions. It is still another object of this invention to provide a method of pneumatically repairing the interiors of oxygen steelmaking vessels and the like.

Brief description

Briefly, according to a broad aspect of this invention, the objects and advantages are achieved as follows: A basic refractory gunning mix is batched and sized according to Table I.

TABLE I

| | Parts |
|---|---|
| Basic refractory material | 20 to 80 |
|    —4+10 mesh | 20 to 40 |
|    Substantially all —10+65 mesh | Remainder |
| Dead burned hydratable dolomitic material | 20 to 40 |

Up to 5 parts sodium silicate, magnesium chloride, Epsom salts, phosphate glass or other commonly used binder may be added to this batch. Up to 2 parts plasticizers, such as bentonite or asbestos may be added. It is, of course, desired to keep the bonds and plasticizers at a minimum which is possible because of the unique character of the fine dead burned dolomitic material. This batch is then sprayed from guns or is "gunned" at high velocity and pressure to form a very homogeneous, densely packed lining substantially free from laminations and cracks. Water is added at the nozzle during the gunning operation to aid in the initial adhesion of the material to the furnace wall and help reduce dusting.

Detailed description

According to one aspect of this invention, a gunning mix having the following composition is prepared:

TABLE II

Dead burned magnesite (having chemical analysis shown in Table III):

| | Parts |
|---|---|
|    —4+10 mesh | 30 |
|    —10+6 mesh | 30 |

Partially stabilized dolomite (having chemical analysis shown in Table III):

| | |
|---|---|
|    —65 mesh | 40 |
| Sodium silicate | 5 |
| Asbestos | 2 |

The mix is pneumatically placed inside an oxygen steelmaking vessel between heats. Approximately 10 to 15% water is added to the mix at the nozzle of the pneumatic gun.

The presence of calcined dolomite in the fines of a refractory batch to be placed with the aid of an aqueous media has long been considered intolerable. This is because fine dolomite reacts relatively fast with water to form a hydrate. In cold installations such a material obviously could not be tolerated because on hydrating it would crumble and disintegrate. The usual technique for using dolomite in a refractory gunning mix has been to contain it to the coarser fractions using only fine dead burned magnesite or possibly completely stabilized dolomite in the fines fraction. Completely stabilized dolomite contains about 10–15% silica and iron oxide which converts all of the lime to lime silicates and ferrites which have a reduced tendency to hydrate. Refractory gunning mixes according to this invention represent an improvement over these for several reasons. First, fine dead burned magnesite is very expensive compared to dolomite. Furthermore, it is nonreactive and requires the addition of larger quantities of binders such as sodium silicate or phosphates to develop a bond below about 2900° F., which bond is not sufficiently refractory at temperatures above about 3000° F. Completely stabilized dolomite, while relatively inexpensive, is not very refractory and therefore generally unsuitable for the basic oxygen steelmaking vessels.

The fine dolomite used in the practice of this invention must tend to hydrate. This is important, because hydrated dolomite has a plastic character similar to clays and thereby imparts a certain plasticity to the gunning mix. Also, such a dolomite has a higher reactivity at gunning temperatures. An acceptable dolomite for use in the fine fraction of a batch according to the practice of this invention is one which is referred to as partially stabilized. About 5% iron oxide is added to it just prior to burning to aid in this process.

The fine dolomite, while reactive with itself at gunning temperatures, has superior resistance to the basic slags present during the "blowing" of oxygen steelmaking process.

The coarse fraction of a batch according to this invention must be a basic aggregate such as dead burned magnesite, dolomite or possibly chrome ore or mixtures thereof. It is preferred that high purity dead burned dolomite or magnesite (where the total CaO+MgO exceeds 90%) be used.

A small addition (up to 2 parts) of asbestos or other fibrous material may be added to this batch to improve gunnability without changing its refractoriness. It is also permissible to add a small quantity (up to 5 parts) of coarse or fine pitch to this mix.

A typical chemical analysis of the materials useful in the practice of this invention is given in the table below.

TABLE III

|  | Coarse Dead Burned Magnesites | Fine Partially Stabilized Dolomite |
| --- | --- | --- |
| $SiO_2$ | 2.8 | 1.2 |
| $Al_2O_3$ | 0.3 | 0.8 |
| $Fe_2O_3$ | 0.6 | 5.0 |
| CaO | 1.5 | 53.0 |
| MgO | 94.8 | 38.9 |

Having thus described my invention in detail, and with sufficient particularity as to enable those skilled in the art to practice it what I desire to be protected by Letters Patent is set forth in the following claims:

1. Method of pneumatically repairing the interiors of steelmaking furnaces which cannot be maintained at temperature during the repair, comprising the steps of:
   (1) preparing a batch consisting essentially of about 20 to 80 parts, by weight, of a coarse basic refractory aggregate sized so that 20 to 40 parts, by weight, are −4+10 mesh and the remainder substantially all −10+65 mesh, about 20 to 40 parts, by weight, of dead burned partially stabilized dolomite substantially all −65 mesh and up to 5 parts binder material,
   (2) pneumatically emplacing the batch on the interiors of the furnaces with the addition of water to the batch as it is being emplaced.

2. The method of claim 1 wherein the coarse aggregate is selected from the group consisting of dead burned dolomite, dead burned magnesite, chrome ore, and mixtures thereof.

3. The method of claim 1 wherein the binder is selected from the group consisting of sodium silicate, phosphate glass, Epsom salts and magnesium chloride.

4. The method of claim 1 in which the coarse aggregate is a basic material having at least 90%, by weight, CaO plus MgO.

5. The method of claim 1 which contains in addition up to 2 parts plasticizer selected from the group consisting of bentonite and asbestos.

6. The method of claim 1 wherein the partially stabilized dolomite is stabilized with about 5% iron oxide.

References Cited
UNITED STATES PATENTS 2,098,839 11/1937 Sullivan _____ 106—60
3,232,774 2/1966 Kehl _____ 106—63

HELEN M. McCARTHY, *Primary Examiner.*

TOBIAS E. LEVOW, *Examiner.*

JAMES E. POER, *Assistant Examiner.*